US010895287B2

(12) United States Patent
Imanishi et al.

(10) Patent No.: US 10,895,287 B2
(45) Date of Patent: Jan. 19, 2021

(54) CLUTCH DEVICE

(71) Applicant: EXEDY Corporation, Neyagawa (JP)

(72) Inventors: Yoshio Imanishi, Neyagawa (JP); Hidenori Kitazawa, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 50 days.

(21) Appl. No.: 16/277,720

(22) Filed: Feb. 15, 2019

(65) Prior Publication Data
US 2019/0285125 A1    Sep. 19, 2019

(30) Foreign Application Priority Data

Mar. 14, 2018    (JP) .................................. 2018-046126

(51) Int. Cl.
*F16D 13/56* (2006.01)
*F16D 23/12* (2006.01)

(52) U.S. Cl.
CPC ........ *F16D 13/56* (2013.01); *F16D 2013/565* (2013.01); *F16D 2023/123* (2013.01)

(58) Field of Classification Search
CPC .......... F16D 13/52–2013/565; F16D 2023/123
See application file for complete search history.

(56) References Cited

U.S. PATENT DOCUMENTS

| 8,469,169 | B2* | 6/2013 | Nakamura | F16D 13/52 |
| | | | | 192/54.5 |
| 9,353,803 | B2* | 5/2016 | Yoshimoto | F16D 13/56 |
| 9,371,867 | B2* | 6/2016 | Isobe | F16D 13/54 |
| 10,247,260 | B2* | 4/2019 | Kataoka | F16D 13/52 |

(Continued)

FOREIGN PATENT DOCUMENTS

| JP | 2017-101810 A  | 6/2017 |
| JP | 2017-101811 A1 | 6/2017 |
| JP | 2017-172653 A  | 9/2017 |

(Continued)

OTHER PUBLICATIONS

Office Action (Notification of Reasons for Refusal) of the corresponding Japanese Application No. 2018-046126, dated Jan. 28, 2020, 8 pp.

*Primary Examiner* — Ernesto A Suarez
*Assistant Examiner* — James J Taylor, II
(74) *Attorney, Agent, or Firm* — United IP Counselors, LLC

(57) ABSTRACT

The disclosed clutch device includes a clutch housing, a clutch center, a pressure plate, a clutch part, and a cam mechanism. The clutch center includes a first tubular portion shaped to protrude to a first side in an axial direction. The pressure plate includes a plurality of cam portions and a second tubular portion. The plurality of cam portions include a plurality of cam surfaces shaped to protrude to a second side in the axial direction. The second tubular portion is provided on an inner peripheral side of the first tubular portion so as to protrude to the second side in the axial direction. The second tubular portion couples at least part of the plurality of cam portions. The clutch part allows and blocks transmission of power from the clutch housing to an output side. The cam mechanism includes the plurality of cam surfaces and controls a pressing force applied to the clutch part.

8 Claims, 12 Drawing Sheets

(56) References Cited

U.S. PATENT DOCUMENTS

2018/0313413 A1\* 11/2018 Morishita .............. F16D 7/044
2019/0017554 A1\* 1/2019 Isobe ..................... F16D 13/04

FOREIGN PATENT DOCUMENTS

| JP | 2019-078373 A | 5/2019 | | |
|---|---|---|---|---|
| WO | WO-2018221135 A1 | \* | 12/2018 | ............. F16D 13/70 |
| WO | WO-2019082597 A1 | \* | 5/2019 | ........... F16D 43/202 |

\* cited by examiner

CLUTCH DEVICE

CROSS-REFERENCE TO RELATED APPLICATIONS

This application claims priority to Japanese Patent Application No. 2018-046126, filed Mar. 14, 2018. The contents of that application are incorporated by reference herein in their entirety.

BACKGROUND

1. Technical Field

The present disclosure relates to a clutch device.

2. Description of the Related Art

In general, motorcycles (a two-wheeled motorcycle, a buggy, etc.) use a clutch device so as to allow or block transmitting power from an engine to a transmission. The clutch device includes a clutch housing, a clutch center, a clutch part and a pressure plate. The clutch housing is coupled to an engine crankshaft side. The clutch center is coupled to a transmission side. The clutch part is disposed between the clutch housing and the clutch center so as to allow or block transmission of power. The pressure plate is provided for pressing the clutch part.

A clutch device described in Japan Laid-open Patent Application Publication No. 2017-101811 has been proposed as this type of clutch device. The clutch device includes the clutch part disposed axially between the clutch center and the pressure plate. The clutch part includes a plurality of drive plates and a plurality of driven plates. The drive plates are axially movable with respect to the clutch housing, while being non-rotatable relatively thereto. The driven plates are axially movable with respect to the clutch center, while being non-rotatable relatively thereto. Additionally, when these plates are pressed to each other by the pressure plate, a torque is transmitted from the clutch housing to the clutch center.

In the clutch device described in Japan Laid-open Patent Application Publication No. 2017-101811, cam mechanisms, each of which controls a pressing force applied to the clutch part, are provided between the clutch center and the pressure plate and between the pressure plate and a support plate.

In the clutch device described in Japan Laid-open Patent Application Publication No. 2017-101811, each of the support plate and the clutch center is provided with a plurality of cam protrusions axially protruding so as to compose cam surfaces of one of the cam mechanisms. Additionally, when an axial force and a circumferential force act on each cam protrusion in actuation of the cam mechanism, a large stress occurs in the base end of each cam protrusion and so forth.

Additionally, the pressure plate is provided with a plurality of openings that a plurality of fixation protrusions provided on the clutch center pass therethrough. Hence, the openings result in insufficiency in stiffness of the pressure plate.

BRIEF SUMMARY

It is an object of the present advancement to enhance the strength of such a rotor as a clutch center, a pressure plate or a support plate including a plurality of cam protrusions and/or a plurality of openings.

(1) A clutch device according to an aspect of the present advancement includes a clutch housing, a first rotor, a second rotor, a clutch part and a cam mechanism. The first rotor is accommodated in an interior of the clutch housing, and includes a first pressure applying portion and a first tubular portion shaped to protrude to a first side in an axial direction. The second rotor includes a second pressure applying portion, a plurality of cams and a second tubular portion. The second pressure applying portion is disposed at an interval from the first pressure applying portion in the axial direction. The plurality of cams are shaped to protrude to a second side in the axial direction. The second tubular portion is provided on an inner peripheral side of the first tubular portion and is shaped to protrude to the second side in the axial direction. The second tubular portion couples at least part of the plurality of cams. The clutch part is disposed between the first pressure applying portion and the second pressure applying portion. The clutch part allows and blocks transmission of power from the clutch housing to an output side. The cam mechanism includes the plurality of cams and controls a pressing force applied to the clutch part.

In the present device, a torque inputted to the clutch housing is transmitted to an output side through the clutch part. Here, the second rotor is provided with the plural cams protruding in the axial direction. These cams are at least in part coupled by the second tubular portion. Because of this, concentration of a stress on the base end of each cam and so forth can be avoided in comparison with such a configuration as seen in a well-known device that a plurality of cams are shaped to protrude separately from each other.

Additionally, even when the second rotor is provided with at least one opening, insufficiency in stiffness of the second rotor can be avoided by the second tubular portion.

(2) Preferably, each of the plurality of cams is shaped to extend in the axial direction from an axially first side end thereof provided as a starting end. Additionally, the second tubular portion extends in the axial direction from an axially first side end surface thereof beyond the starting end of the each of the plurality of cams.

Here, the cams are annularly coupled at least in part (i.e., at parts thereof each ranging from the starting end to an intermediate position toward the distal end) by the second tubular portion. Because of this, similarly to the above, concentration of a stress on the base end of each cam and so forth can be avoided.

(3) Preferably, the first rotor includes a plurality of first protruding portions, extending to the first side in the axial direction, on the inner peripheral side of the first tubular portion. Additionally, the plurality of first protruding portions are disposed on the inner peripheral side of the second tubular portion.

Here, the first protruding portions of the first rotor and the second tubular portion of the second rotor are disposed to overlap with each other. Hence, the present device can be reduced in axial space.

(4) Preferably, the plurality of first protruding portions each include a cam protrusion provided with a cam surface forming part of the cam mechanism.

(5) Preferably, the clutch device further includes a support member. The support member is disposed in axial opposition to the first rotor while the second rotor is interposed therebetween. The support member is fixed to the first rotor. Additionally, the second rotor includes a plurality of openings. The plurality of first protruding portions each include a first fixation protrusion to which the support member is fixed and that is inserted into each of the plurality of openings.

Here, the first protruding portions of the first rotor are provided with the first fixation protrusions, respectively, and the support member is fixed to the first fixation protrusions. The second rotor is provided with the plural openings, but the plural cams are coupled by the second tubular portion. Hence, degradation in stiffness of the second rotor can be inhibited.

(6) Preferably, the support member includes a plurality of second protruding portions protruding to the second side in the axial direction. Additionally, the plurality of second protruding portions are attached to at least one of the plurality of first protruding portions.

Here, protruding portions for coupling the first rotor and the support member are divided into the first protruding portions provided on the first rotor and the plurality of second protruding portions provided on the support member. Because of this, when each protruding portion on each member is shaped to be advantageous in strength, a part of each member, not provided with any protruding portion, can be made in the shape of a thin plate. Accordingly, each member can be made as lightweight as possible, while degradation in strength thereof can be inhibited.

(7) Preferably, an inner peripheral surface of the first tubular portion is fitted to an outer peripheral surface of the second tubular portion while a clearance is kept therebetween. Here, the first rotor and the second rotor can be radially positioned relatively to each other by fitting the first tubular portion and the second tubular portion to each other.

(8) Preferably, the first rotor is a clutch center that includes a pressure receiving portion having an annular shape on an outer peripheral part thereof and is coupled at an inner peripheral part thereof to a transmission-side member. The pressure receiving portion corresponds to the first pressure applying portion. The second rotor is a pressure plate that is disposed on the first side of the clutch center in the axial direction so as to be movable in the axial direction with respect to the clutch center and includes a pressure applying portion disposed at an interval from the pressure receiving portion. The pressure applying portion corresponds to the second pressure applying portion. The support member is a support plate that is fixed to the clutch center and applies the pressing force to the pressure plate. Additionally, the clutch device further includes an urging member. The urging member is disposed between the support plate and the pressure plate, and applies the pressing force to the pressure plate so as to turn the clutch part to a power transmission allowed state.

In the present device, the pressure plate is urged toward the clutch center by the urging member. Because of this, the pressure applying portion presses the clutch part onto the pressure receiving portion, whereby the clutch part is turned to the power transmission allowed state. When the pressure plate is then moved against the urging force of the urging member, the clutch part is turned to a power transmission blocked state.

(9) Preferably, the second rotor is a clutch center that includes a pressure receiving portion having an annular shape on an outer peripheral part thereof and is coupled at an inner peripheral part thereof to a transmission-side member. The pressure receiving portion corresponds to the second pressure applying portion. The first rotor is a pressure plate that is disposed on the second side of the clutch center in the axial direction so as to be movable in the axial direction with respect to the clutch center and includes a pressure applying portion disposed at an interval from the pressure receiving portion. The pressure applying portion corresponds to the first pressure applying portion.

Besides preferably, the clutch device further includes a lifter plate and an urging member. The lifter plate is fixed to the pressure plate and presses the pressure plate onto the clutch center. The urging member is disposed between the lifter plate and the clutch center, and applies the pressing force to the pressure plate so as to turn the clutch part to a power transmission allowed state.

In the present device, the pressure plate is urged toward the clutch center by the urging member. Because of this, the pressure applying portion presses the clutch part onto the pressure receiving portion, whereby the clutch part is turned to the power transmission allowed state. When the pressure plate is then moved through the lifter plate against the urging force of the urging member, the clutch part is turned to a power transmission blocked state.

Overall, in the present advancement described above, the strength of a rotor including a plurality of cam protrusions and/or a plurality of openings can be enhanced.

DETAILED DESCRIPTION

[Entire Configuration]

Figure 1A:
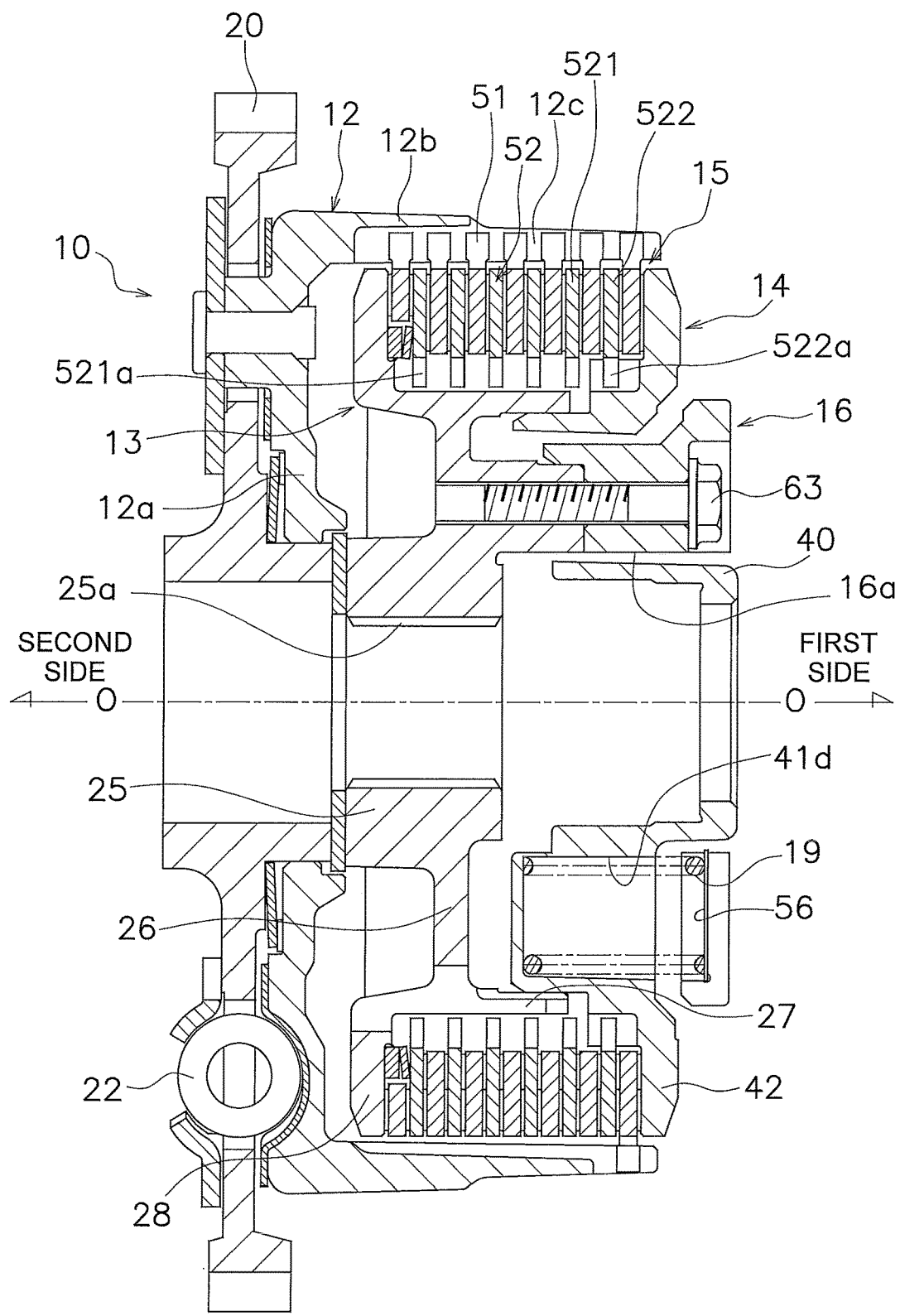
FIG. 1A is a cross-sectional view of a clutch device according to a preferred embodiment of the present disclosure.

FIGS. 1A to 8 show a clutch device 10 for a motorcycle as a clutch device according to a preferred embodiment of the present disclosure. FIG. 1A is a cross-sectional view of the clutch device 10, whereas FIG. 1B is a cross-sectional view of the clutch device 10 taken at a different position from FIG. 1A. On the other hand, FIGS. 2 to 4 and 7 are external perspective views of major members. In the cross-sectional views of FIGS. 1A and 1B, line O-O indicates a rotational axis. It should be noted that in the following explanation, the term "axial direction" indicates an extending direction of the rotational axis O. As shown in FIGS. 1A and 1B, the right side in FIGS. 1A and 1B is defined as "a first side in the axial direction" whereas the left side in FIGS. 1A and 1B is defined as "a second side in the axial direction".

The clutch device 10 is configured to allow or block transmitting power from an engine to a transmission. The clutch device 10 includes a clutch housing 12, a clutch center 13 (exemplary first rotor), a pressure plate 14 (exemplary second rotor), a clutch part 15, a support plate 16 (exemplary support member), an assist cam mechanism 17 (see FIG. 1B) and a slipper cam mechanism 18 (see FIG. 1B). Additionally, the clutch device 10 further includes a plurality of coil springs 19 for applying pressure.

[Clutch Housing 12]

The clutch housing 12 includes a disc portion 12a and a tubular portion 12b, and is coupled to an input gear 20. The input gear 20 is meshed with a drive gear (not shown in the drawings) fixed to an engine-side crankshaft.

The input gear 20 is coupled to the disc portion 12a through a plurality of coil springs 22. The plural coil springs 22 are provided for absorbing vibration from the engine, and are inserted into holes provided in the input gear 20.

The tubular portion 12b is shaped to extend from the outer peripheral edge of the disc portion 12a to the first side in the axial direction. The tubular portion 12b is provided with a plurality of cutouts 12c extending in the axial direction. The plural cutouts 12c are aligned at predetermined intervals in a circumferential direction.

[Clutch Center 13]

The clutch center 13 is disposed in the interior of the clutch housing 12, i.e., inside the inner periphery of the tubular portion 12b of the clutch housing 12. The clutch center 13 has an approximately disc shape and includes a boss portion 25 provided on the middle part thereof, a disc portion 26, a tubular portion 27 (exemplary first tubular portion) and a pressure receiving portion 28 (exemplary first pressure applying portion).

The boss portion 25 extends to protrude to the first side in the axial direction. The boss portion 25 is provided with a spline hole 25a in the middle part thereof. The spline hole 25a extends in the axial direction. An input shaft (not shown in the drawings) of the transmission is engaged with the spline hole 25a. It should be noted that the clutch center 13 is not moved in the axial direction.

Figure 2:
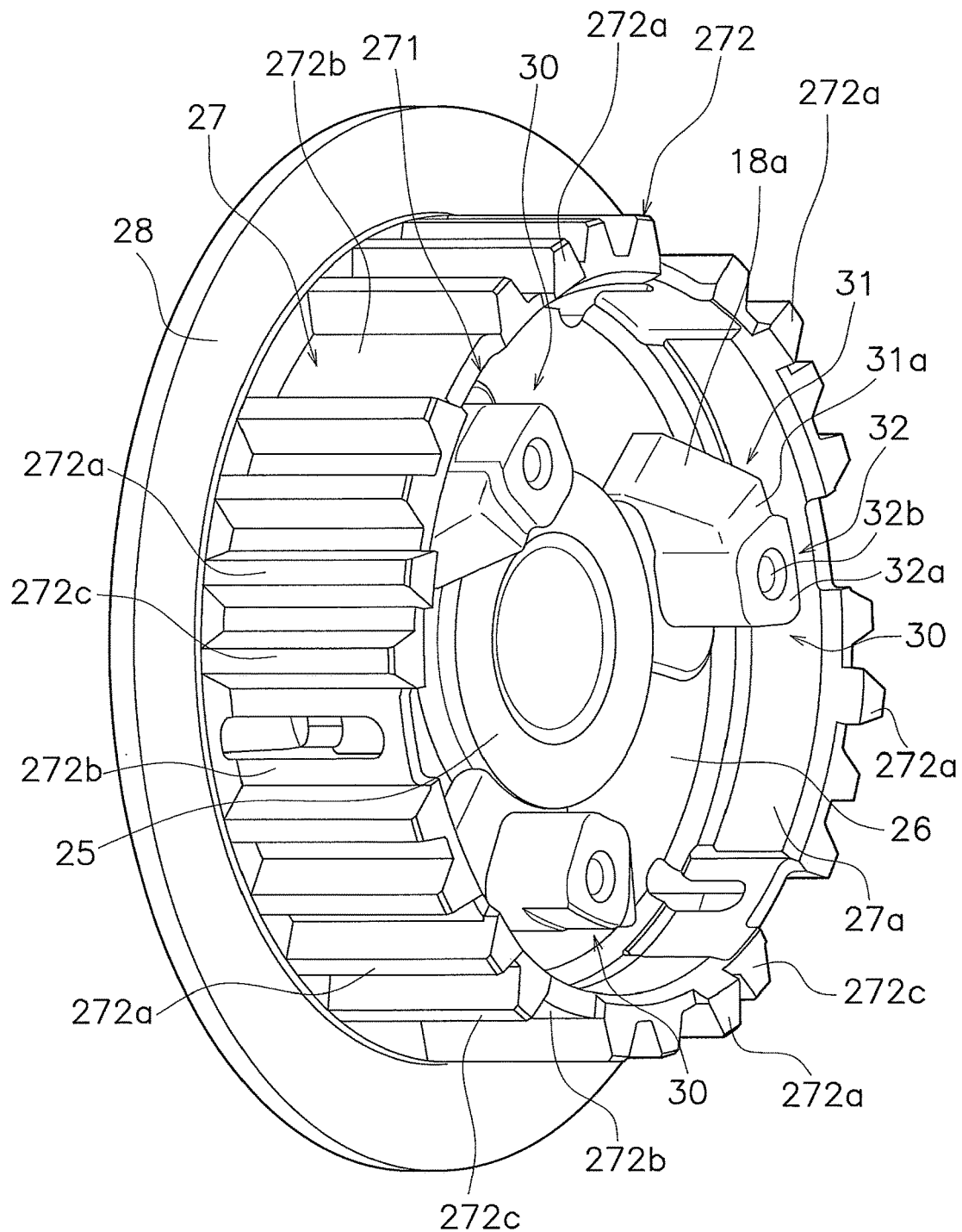
FIG. 2 is an external perspective view of a clutch center.

The disc portion 26 is shaped to extend from the boss portion 25 to an outer peripheral side. As shown in FIG. 2, the disc portion 26 is provided with three first protruding portions 30. The three first protruding portions 30 are provided on a radially intermediate part of the disc portion 26, while being aligned at equal angular intervals in the circumferential direction. The three first protruding portions 30 protrude to the first side in the axial direction. Additionally, the three first protruding portions 30 are provided away from an inner peripheral surface 27a of the tubular portion 27. In other words, a gap is reliably produced between the outer peripheral surface of each first protruding portion 30 and the inner peripheral surface 27a of the tubular portion 27.

Each first protruding portion 30 includes a first cam protrusion 31 and a first fixation protrusion 32. The first cam protrusion 31 and the first fixation protrusion 32 are integrally shaped to continue to each other in the circumferential direction.

The first cam protrusion 31 is provided with a clutch center 13-side cam surface 18a (hereinafter referred to as "CC cam surface 18a"), composing part of the slipper cam mechanism 18, on the end surface thereof in the circumferential direction (i.e., one end surface of the first protruding portion 30 in the circumferential direction). This configuration will be described below in detail.

The axial length of the first fixation protrusion 32, i.e., the height of the first fixation protrusion 32, is greater than that of the first cam protrusion 31. In other words, a distal end surface 32a of the first fixation protrusion 32 (axially first side end surface) further protrudes than a distal end surface 31a of the first cam protrusion 31 to the first side in the axial direction. Additionally, the height of the first fixation protrusion 32 is less than that of the tubular portion 27.

With the configuration of the first fixation protrusion 32 described above, the distal end surface 32a of the first fixation protrusion 32 can be machined by a lathe.

Additionally, the first fixation protrusion 32 is provided with a screw hole 32b, extending in the axial direction, in the center part thereof.

The tubular portion 27 is shaped to extend from the outer peripheral part of the disc portion 26 to the first side in the axial direction. The tubular portion 27 includes a body 271 having a cylindrical shape and a plurality of first teeth 272 for engagement provided on the outer peripheral surface of the body 271. It should be noted that the tubular portion 27 and the plural first teeth 272 for engagement will be described below in detail.

The pressure receiving portion 28 is provided on the outer peripheral side of the tubular portion 27, and extends to the further outer peripheral side. The pressure receiving portion 28 has an annular shape and faces the first side in the axial direction. The pressure receiving portion 28 is opposed to the clutch part 15.

[Pressure Plate 14]

Figure 3:
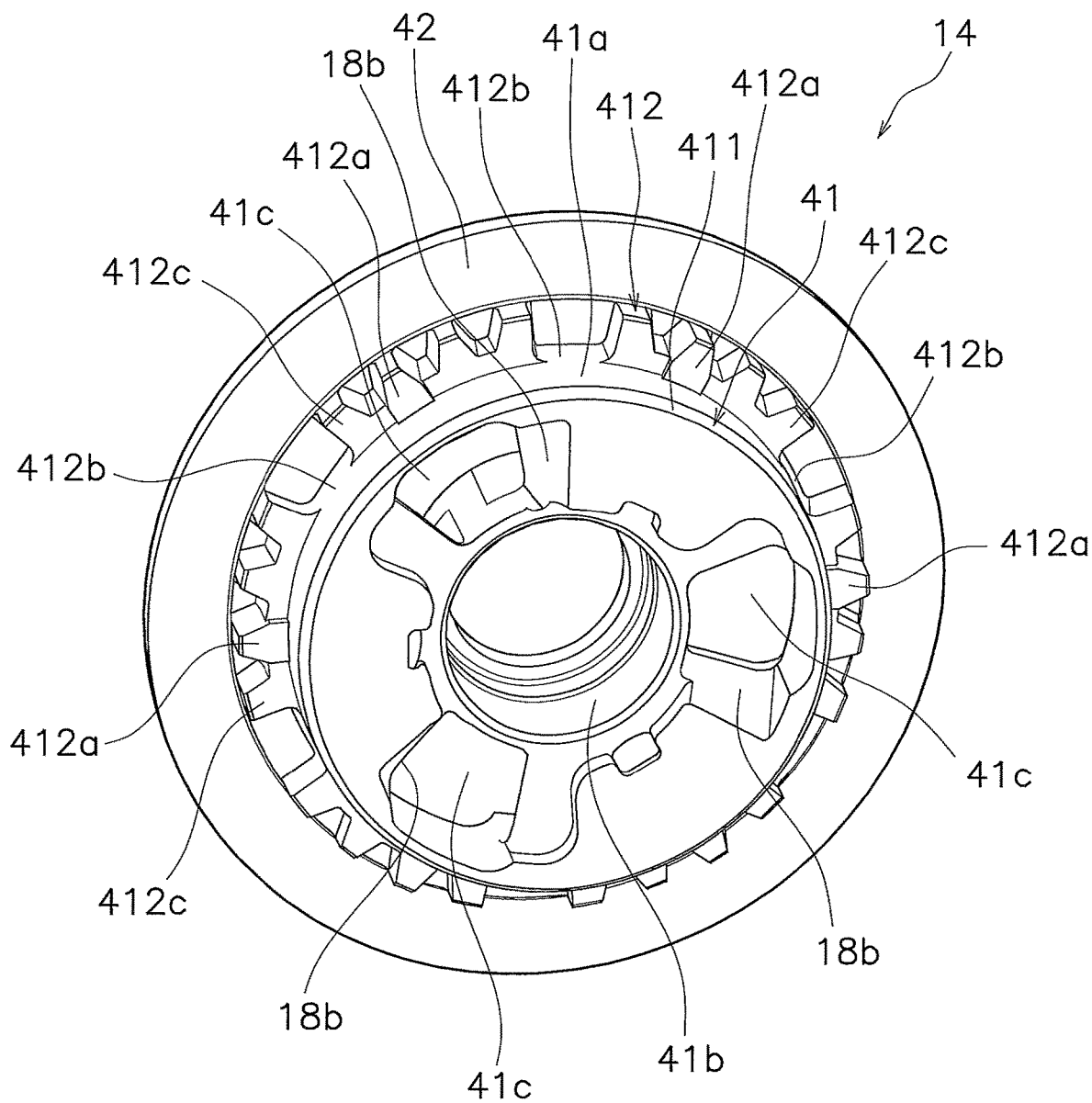
FIG. 3 is an external perspective view of a pressure plate as seen from a second side in an axial direction.
Figure 4:
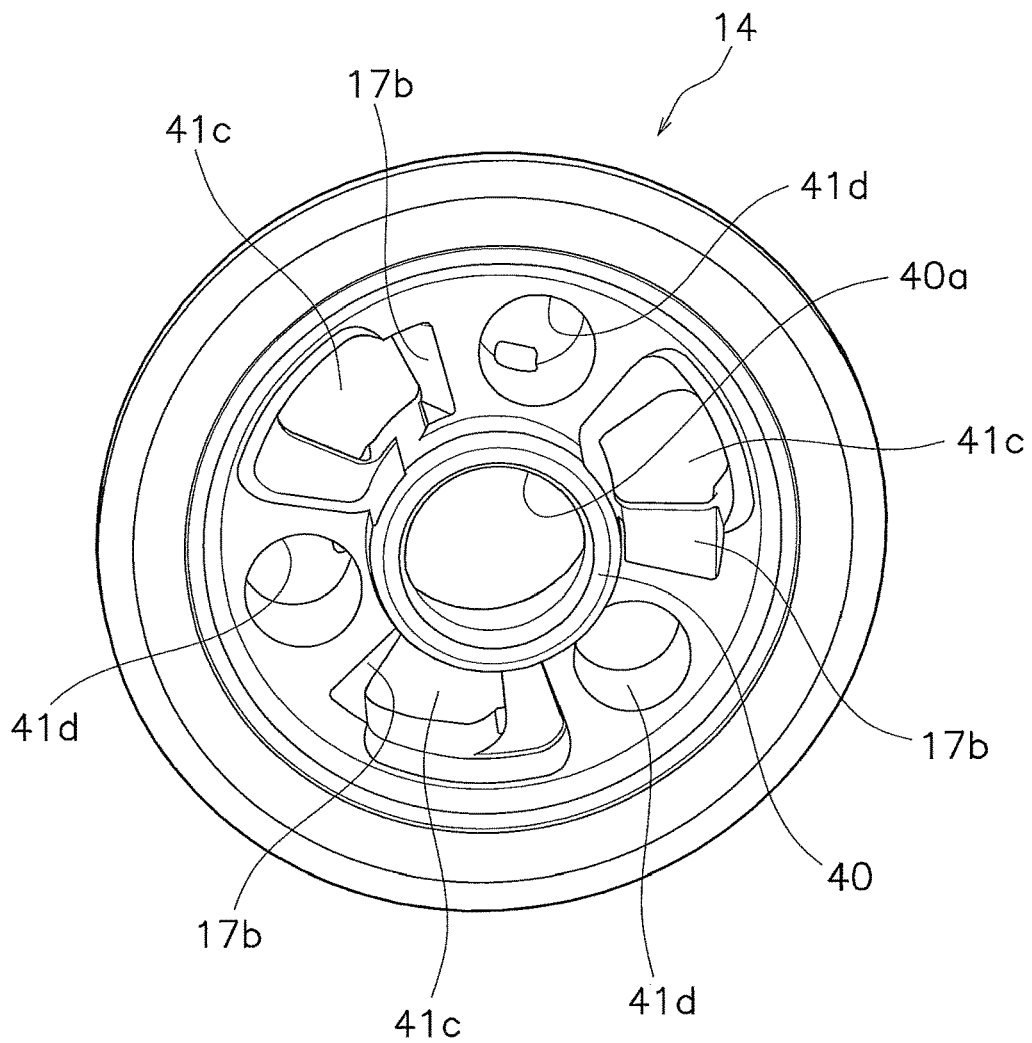
FIG. 4 is an external perspective view of the pressure plate as seen from a first side in the axial direction.

As shown in FIGS. 1A, 1B, 3 and 4, the pressure plate 14 is a disc-shaped member and is disposed on the first side of the clutch center 13 in the axial direction. It should be noted that FIG. 3 is a view of the pressure plate 14 as seen from the clutch center 13 side, whereas FIG. 4 is a view of the pressure plate 14 as seen from the opposite side of the clutch center 13.

The pressure plate 14 is axially movable with respect to the clutch center 13. The pressure plate 14 includes a boss portion 40 provided on the middle part thereof, a tubular portion 41 (exemplary second tubular portion) and a pressure applying portion 42 (exemplary second pressure applying portion).

The boss portion 40 extends to protrude to the first side in the axial direction. The boss portion 40 is provided with a hole 40a having a circular shape in the middle thereof. A release member (not shown in the drawings) is inserted into the hole 40a.

The tubular portion 41 is provided on the outer peripheral side of the boss portion 40 and protrudes to the second side in the axial direction. The tubular portion 41 is disposed to overlap the tubular portion 27 of the clutch center 13 as seen in a direction orthogonal to the axial direction. Additionally, the tubular portion 41 is disposed to be inserted into a gap between the tubular portion 27 and the first protruding portions 30 in the clutch center 13.

The tubular portion 41 includes a body 411 having a cylindrical shape and a plurality of second teeth 412 for engagement provided on the outer peripheral surface of the body 411. The plural second teeth 412 are provided on the axially first side end on the outer peripheral surface of the body 411. The axial length of the plural second teeth 412 is less than that of the body 411.

Figure 5:
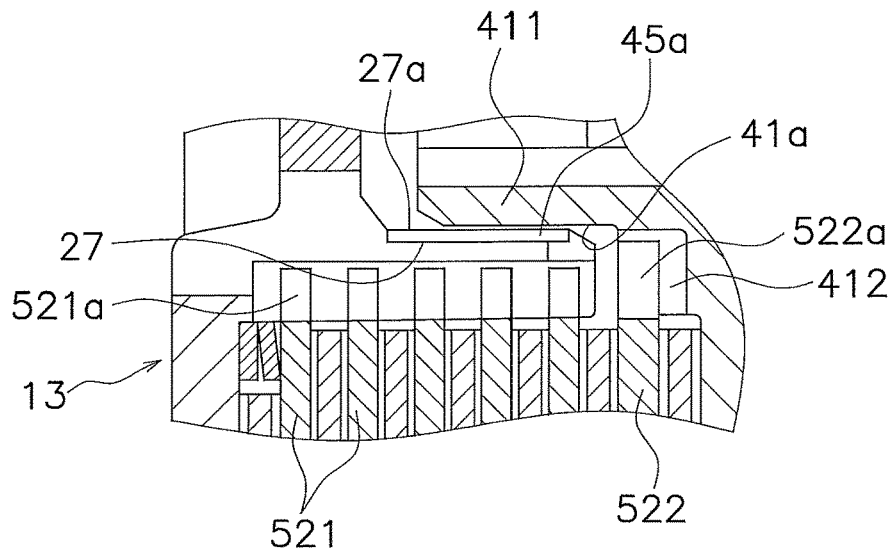
FIG. 5 is an enlarged view of part of FIG. 1A.

As shown in an enlarged view of FIG. 5, an outer peripheral surface 41a of the tubular portion 41 is fitted to the inner peripheral surface 27a of the tubular portion 27 of the clutch center 13 while a clearance is kept therebetween. Thus, the pressure plate 14 is radially positioned with respect to the clutch center 13 by fitting between the outer peripheral surface 41a of the tubular portion 41 of the pressure plate 14 and the inner peripheral surface 27a of the tubular portion 27 of the clutch center 13.

Additionally, the tubular portion 41 includes a hole 41b, which has an approximately circular shape and is provided in the middle part thereof, three cam holes 41c and three closed-end holes 41d (see FIG. 4).

Figure 8:
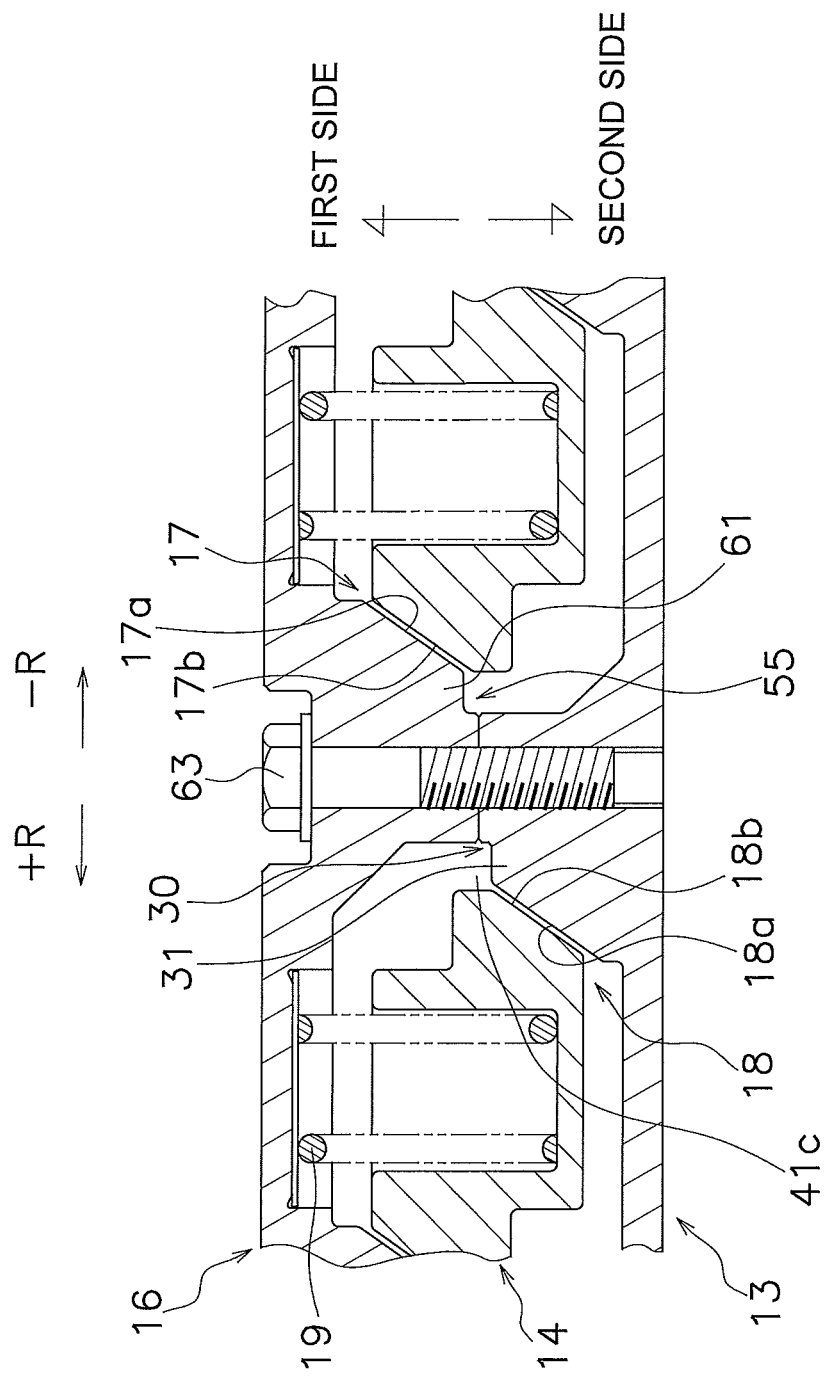
FIG. 8 is a planar net for explaining cam mechanisms.

The cam holes 41c are provided on the outer peripheral side of the hole 41b provided in the middle part of the tubular portion 41 so as to extend radially outward. As shown in FIGS. 3, 4 and 8, in each cam hole 41c, a cam surface 17b for the assist cam mechanism 17 (hereinafter referred to as "PPa cam surface 17b") is provided on axially first side one of circumferentially opposed wall surfaces, whereas a cam surface 18b for the slipper cam mechanism 18 (hereinafter referred to as "PPs cam surface 18b") is provided on axially second side one of the circumferentially opposed wall surfaces. The respective cam surfaces 17b and 18b will be described below in detail. The closed-end holes 41d are provided on the outer peripheral side of the hole 41b at a predetermined depth from the axially first side surface of the tubular portion 41. As shown in FIGS. 1A and 8, the coil springs 19 are disposed in the closed-end holes 41d, respectively.

The pressure applying portion 42 has an annular shape and is provided as the outer peripheral part of the pressure plate 14. The pressure applying portion 42 faces the second side in the axial direction. Additionally, the pressure applying portion 42 is disposed at an interval from the pressure receiving portion 28 of the clutch center 13 in the axial direction. The clutch part 15 is disposed between the pressure applying portion 42 and the pressure receiving portion 28. In other words, the pressure receiving portion 28, the clutch part 15 and the pressure applying portion 42 are sequentially aligned in this order from the second side to the first side in the axial direction <Oil Pathway>

Figure 6:
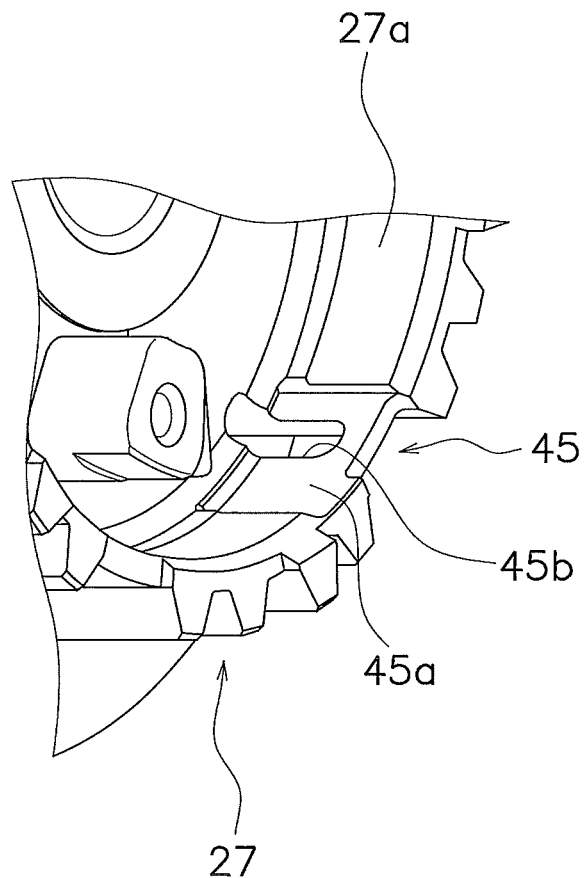
FIG. 6 is a view showing an oil pathway provided on the inner peripheral surface of a tubular portion of the clutch center.

As shown in FIG. 6, the tubular portion 27 of the clutch center 13 is provided with an oil pathway 45. The oil pathway 45 is provided for supplying lubricating oil residing on the inner peripheral side of the tubular portion 27 to the clutch part 15 disposed on the outer peripheral side of the tubular portion 27.

The oil pathway 45 includes a plurality of grooves 45a and a plurality of communicating holes 45b. The grooves 45a are provided on the inner peripheral surface 27a of the tubular portion 27. Each groove 45a has a predetermined depth and has a predetermined width in the circumferential direction. The circumferential width of each groove 45a is greater than that of each communicating hole 45b. Additionally, each groove 45 is opened to the first side in the axial direction, and is shaped to further extend than the distal end surface of the tubular portion 41 of the pressure plate 14 to the second side in the axial direction. Each communicating hole 45b is shaped to penetrate the tubular portion 27 from the bottom surface of each groove 45a to the outer peripheral surface of the tubular portion 27. It should be noted that the first teeth 272 are missing at the sites that the communicating holes 45b are provided.

With the oil pathway 45 described above, during actuation, the lubricating oil residing on the inner peripheral side of the tubular portion 27 is temporarily accumulated in the grooves 45a by centrifugal forces, and is then supplied from the grooves 45a to the clutch part 15 disposed on the outer peripheral side of the tubular portion 27 through the communicating holes 45b. Additionally, the grooves 45a are opened to the first side in the axial direction. Hence, the lubricating oil accumulated in the grooves 45a is also led to the first side in the axial direction, i.e., the second teeth 412 of the pressure plate 14. The lubricating oil led to the second teeth 412 is also supplied to the surface of a second driven plate 522 to be described.

[Clutch Part 15]

Figure 1B:
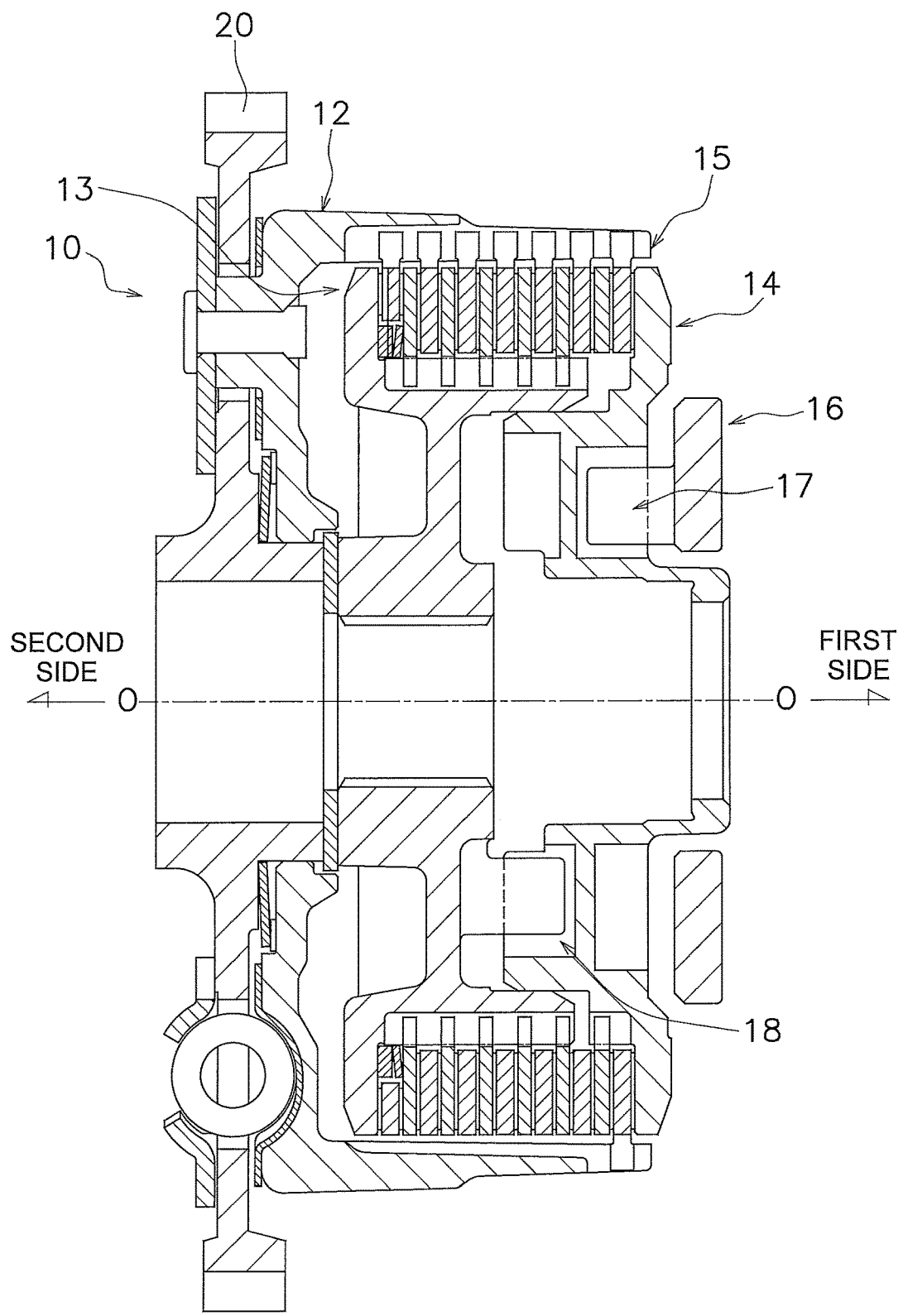
FIG. 1B is another cross-sectional view of part of the clutch device.

As shown in FIGS. 1A and 1B, the clutch part 15 includes a plurality of drive plates 51 and a plurality of driven plates 52. The drive plates 51 and the driven plates 52 are disposed between the pressure receiving portion 28 and the pressure applying portion 42. Transmission of power is allowed or blocked between the clutch housing 12 and both the clutch center 13 and the pressure plate 14 through the both types of plates 51 and 52. The both types of plates 51 and 52 are annularly shaped and are alternately disposed in the axial direction.

The drive plates 51 are axially movable with respect to the clutch housing 12, while being non-rotatable relatively thereto. In other words, the drive plates 51 are unitarily rotated with the clutch housing 12. Detailedly, each drive plate 51 is provided with a plurality of engaging protrusions that protrude radially outward from the outer peripheral part thereof. The engaging protrusions are meshed with the cutouts 12c for engagement that are provided in the tubular portion 12b of the clutch housing 12. Friction members are attached to the both surfaces of each drive plate 51.

The driven plates 52 are composed of a plurality of first driven plates 521 and the single second driven plate 522. Each of the first and second driven plates 521 and 522 includes a plurality of engaging recesses 521a, 522a (see FIGS. 1A and 5) on the inner peripheral end thereof.

The engaging recesses 521a of each first driven plate 521 are engaged with the first teeth 272 for engagement that are provided on the tubular portion 27 of the clutch center 13. On the other hand, the engaging recesses 522a of the second driven plate 522 are engaged with the second teeth 412 of the pressure plate 14. Therefore, each first driven plate 521 is axially movable with respect to the clutch center 13, while being non-rotatable relatively thereto. In other words, each first driven plate 521 is unitarily rotated with the clutch center 13. On the other hand, the second driven plate 522 is axially movable with respect to the pressure plate 14, while being non-rotatable relatively thereto. In other words, the second driven plate 522 is unitarily rotated with the pressure plate 14.

[Support Plate 16]

Figure 7:
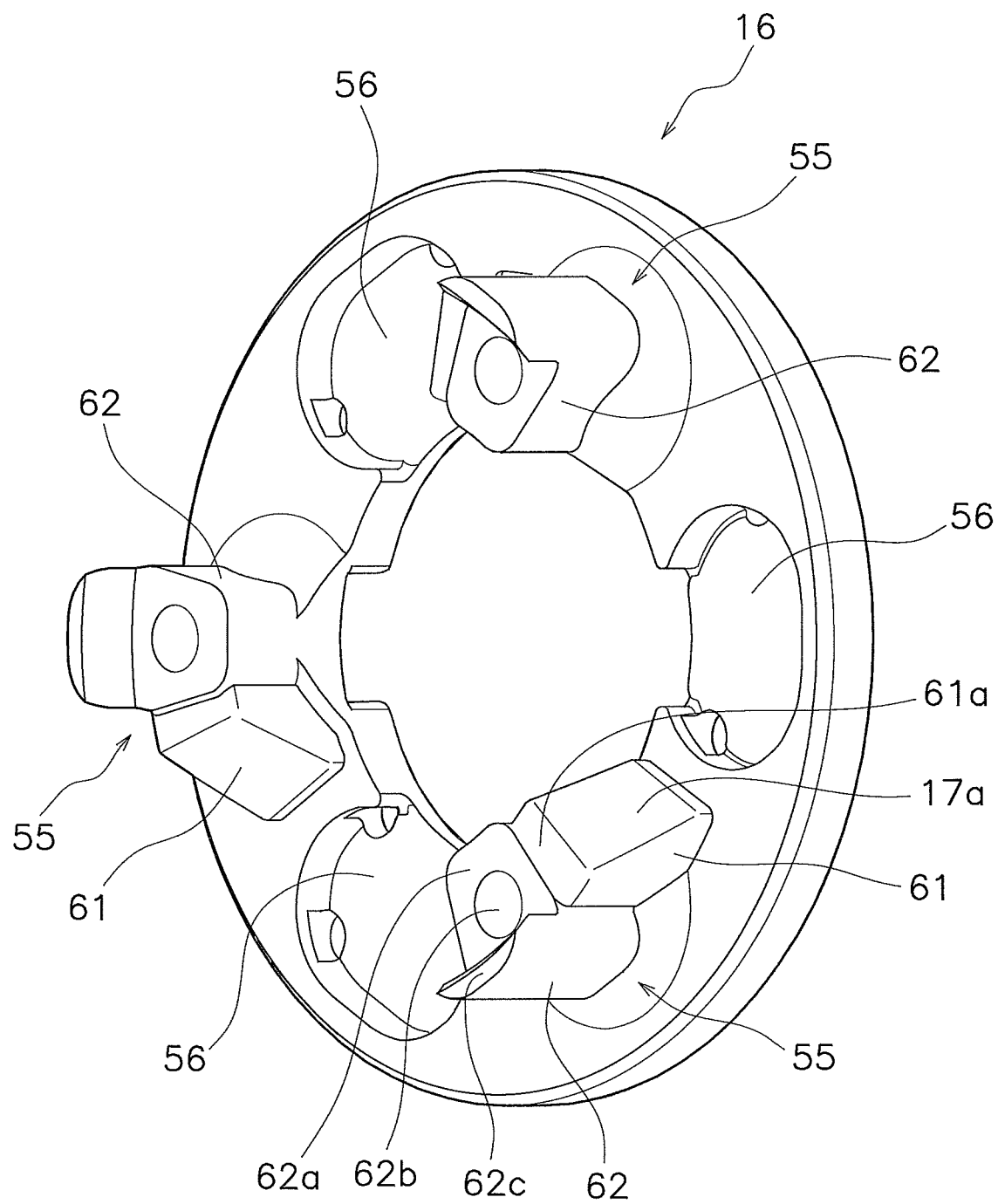
FIG. 7 is an external perspective view of a support plate.

The support plate 16 is a disc-shaped member and is disposed on the first side of the pressure plate 14 in the axial direction. As shown in FIGS. 1A, 1B and 7, the support plate 16 includes a hole 16a in the middle part thereof, and the hole 16a is penetrated by the boss portion 40 of the pressure plate 14. Additionally, the support plate 16 includes three second protruding portions 55 and three support recessed portion 56.

The three second protruding portions 55 are provided on the outer peripheral side of the hole 16a, while being aligned at equal angular intervals in the circumferential direction. The three second protruding portions 55 protrude to the second side in the axial direction. Each second protruding portion 55 includes a second cam protrusion 61 and a second fixation protrusion 62. The second cam protrusion 61 and the second fixation protrusion 62 are integrally shaped to continue to each other in the circumferential direction.

The second cam protrusion 61 is provided with a support plate 16-side cam surface 17a (hereinafter referred to as "SP cam surface 17a"), composing part of the assist cam mechanism 17, on the end surface thereof in the circumferential direction (i.e., one end surface of the second protruding portion 55 in the circumferential direction).

The axial length of the second fixation protrusion 62, i.e., the height of the second fixation protrusion 62, is greater than that of the second cam protrusion 61. In other words, a distal end surface 62a of the second fixation protrusion 62 (axially second side end surface) further protrudes than a distal end surface 61a of the second cam protrusion 61 to the second side in the axial direction.

With the configuration of the second fixation protrusion 62 described above, the distal end surface 62a of the second fixation protrusion 62 can be machined by a lathe.

Additionally, the second fixation protrusion 62 is provided with a through hole 62b, extending in the axial direction, in the center part thereof. Additionally, while the distal end surfaces 32a of the first fixation protrusions 32 of the clutch center 13 and the distal end surfaces 62a of the second fixation protrusions 62 of the support plate 16 are in contact with each other, bolts 63 (see FIG. 1A) are inserted through the through holes 62b of the second fixation protrusions 62 respectively, and are further screwed into the screw holes 32b of the first fixation protrusions 32 of the clutch center 13 respectively. Accordingly, the support plate 16 is fixed to the clutch center 13.

Moreover, the second fixation protrusion 62 is provided with a positioning portion 62c on the outer peripheral part thereof. The positioning portion 62c further protrudes than the distal end surface 62a of the second fixation protrusion 62 to the second side in the axial direction. The inner peripheral-side surface of the positioning portion 62c is shaped along the outer peripheral surface of the first fixation protrusion 32 of the clutch center 13, whereby the both make contact with each other. With the contact of the both, the support plate 16 is radially positioned with respect to the clutch center 13.

The coil springs 19 make contact at the end surfaces thereof with the support recessed portions 56, respectively. In other words, the coil springs 19 urge the pressure plate 14 to the second side in the axial direction, while being disposed between the bottom surfaces of the closed-end holes 41d of the pressure plate 14 and the support recessed portions 56 of the support plate 16, respectively. When the release mechanism is not being actuated, the clutch part 15 is turned to a clutch-on state (a state in which transmission of power is allowed) by the urging forces.

[Assist Cam Mechanism 17 and Slipper Cam Mechanism 18]

The assist cam mechanism 17 is disposed between the pressure plate 14 and the support plate 16 in the axial direction. The assist cam mechanism 17 is a mechanism for increasing an engaging force of the clutch part 15 when a forward drive force (positive-side torque) acts on the clutch center 13 and the pressure plate 14. On the other hand, the slipper cam mechanism 18 is disposed between the pressure plate 14 and the clutch center 13 in the axial direction. The slipper cam mechanism 18 is a mechanism for reducing the engaging force of the clutch part 15 when a reverse drive force (negative-side torque) acts on the clutch center 13 and the pressure plate 14.

<Assist Cam Mechanism 17>

As shown in FIGS. 4, 7 and 8, the assist cam mechanism 17 includes a plurality of (herein three) SP cam surfaces 17a provided on the support plate 16 and a plurality of (herein three) PPa cam surfaces 17b provided on the pressure plate 14.

Each second cam protrusion 61 of the support plate 16 is provided with each SP cam surface 17a. As described above, each second cam protrusion 61, composing each second protruding portion 55 together with each second fixation protrusion 62, is provided on the axially second-side lateral surface of the support plate 16 and protrudes in the axial direction. Each second protruding portion 55 is inserted into each cam hole 41c of the pressure plate 14. Additionally, each second protruding portion 55 is provided with each SP cam surface 17a on one circumferential end surface thereof. Each SP cam surface 17a slants at a predetermined angle with respect to the circumferential direction.

Each cam hole 41c of the pressure plate 14 is provided with each PPa cam surface 17b. Specifically, each cam hole 41c is provided with each PPa cam surface 17b on one circumferential end surface (wall surface) thereof. Each PPa cam surface 17b slants in parallel to and at the same angle as each SP cam surface 17a with respect to the circumferential direction. Additionally, each SP cam surface 17a is contactable to each PPa cam surface 17b.

<Slipper Cam Mechanism 18>

As shown in FIGS. 2, 3 and 8, the slipper cam mechanism 18 includes a plurality of (herein three) CC cam surfaces 18a provided on the clutch center 13 and a plurality of (herein three) PPs cam surfaces 18b provided on the pressure plate 14.

Each first cam protrusion 31 of the clutch center 13 is provided with each CC cam surface 18a. As described above, each first cam protrusion 31, composing each first protruding portion 30 together with each first fixation protrusion 32, is provided on the axially first-side lateral surface of the clutch center 13 and protrudes in the axial direction. Each first protruding portion 30 is inserted into each cam hole 41c of the pressure plate 14. Additionally, each first protruding portion 30 is provided with each CC cam surface 18a on one circumferential end surface thereof. Each CC cam surface 18a slants at a predetermined angle with respect to the circumferential direction.

Each cam hole 41c of the pressure plate 14 is provided with each PPs cam surface 18b. Specifically in each cam hole 41, an end surface (wall surface), functioning as each PPs cam surface 18b, is disposed circumferentially in opposition to and on the opposite side of the lateral surface (wall surface) on which each PPa cam surface 17b is provided. It should be noted that each PPa cam surface 17b and each PPs cam surface 18b are provided to be displaced from each other in the axial direction. Each PPs cam surface 18b slants in parallel to and at the same angle as each CC cam surface 18a with respect to the circumferential direction. Additionally, each CC cam surface 18a is contactable to each PPs cam surface 18b.

[Directions and Heights of Cam Surfaces]

As described above, the pressure plate 14 includes the tubular portion 41. The tubular portion 41 is provided with the cam holes 41c, and each cam hole 41c is provided with the PPa cam surface 17b and the PPs cam surface 18b on the wall surfaces thereof.

Figure 9:
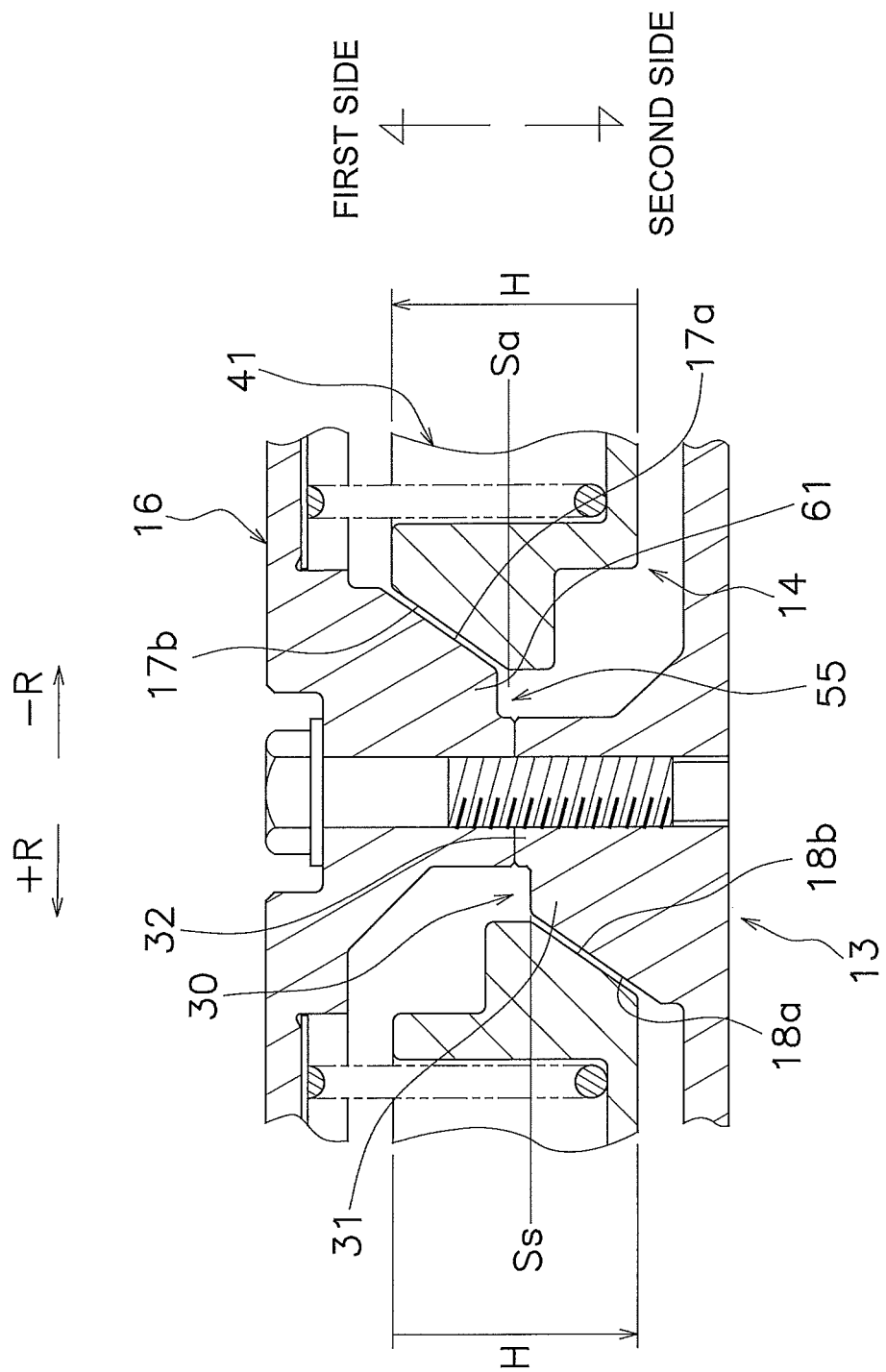
FIG. 9 is a diagram of part extracted from FIG. 8.

Here, the axially second side end of the PPa cam surface 17b is defined as a starting end (Sa), whereas the axially first side end of the PPa cam surface 17b is defined as a terminal end. In this case, as shown in FIG. 9, the tubular portion 41 extends at height H (axial length) from the axially second side surface thereof to the terminal end beyond the starting end Sa of the PPa cam surface 17b. In other words, a part of the tubular portion 41, provided with the PPa cam surface 17b, annularly continues.

Likewise, the axially first side end of the PPs cam surface 18b is defined as a starting end (Ss), whereas the axially second side end of the PPs cam surface 18b is defined as a terminal end. In this case, as shown in FIG. 9, the tubular portion 41 extends at height H (axial length) from the axially first side surface thereof to the terminal end beyond the starting end (Ss) of the PPs cam surface 18*b*. In other words, a part of the tubular portion 41, provided with the PPs cam surface 18*b*, annularly continues.

As described above, the part provided with each cam surface 17*b*, 18*b* annularly continues. Because of this, even when a force acts on each cam surface 17*b*, 18*b*, a stress does not locally occur in the pressure plate 14. The pressure plate 14 is thus enhanced in strength in comparison with a well-known device.

Additionally, each second protruding portion 55 is provided with the SP cam surface 17*a* on a part thereof located on a −R side in the rotational direction, whereas each first protruding portion 30 is provided with the CC cam surface 18*a* on a part thereof located on a +R side in the rotational direction. In other words, in each second protruding portion 55 of the support plate 16, the second cam protrusion 61 is provided on the −R side of the second fixation protrusion 62 in the rotational direction, whereas in each first protruding portion 30 of the clutch center 13, the first cam protrusion 31 is provided on the +R side of the first fixation protrusion 32 in the rotational direction.

When the assist cam mechanism 17 is actuated in the configuration described above, a force directed in a +R direction acts on each SP cam surface 17*a*. The force is received by each pair of fixation protrusions 62 and 32, and is also received by the clutch center 13 through each first cam protrusion 31. In other words, the force can be received by a part with large plate thickness, whereby increase in stress can be inhibited in the clutch center 13.

Likewise, when the slipper cam mechanism 18 is actuated, a force directed in a −R direction acts on each CC cam surface 18*a*. The force is received by each pair of fixation protrusions 32 and 62, and is also received by the support plate 16 through each second cam protrusion 61. Because of this, the force can be received by a part with large plate thickness, whereby increase in stress can be inhibited in the support plate 16.

[First Teeth 272 and Second Teeth 412]

As described above, the clutch center 13 is provided with the plural first teeth 272 for engagement on the outer peripheral surface of the tubular portion 27. On the other hand, the pressure plate 14 is provided with the plural second teeth 412 for engagement on the outer peripheral surface of the tubular portion 41. The first teeth 272 and the second teeth 412 are equal in outer diameter.

As shown in FIG. 2, the plural first teeth 272 include a plurality of (six in this example) first protruding teeth 272*a* that protrude to the first side in the axial direction. Additionally, the plural first teeth 272 are partially missing at six sites, and the missing portions are provided as missing portions 272*b*. It should be noted that the first side in the axial direction is a side on which the first driven plates 521 are assembled to the clutch center 13.

Specifically, the first protruding teeth 272*a* further protrude, at the end surfaces thereof located on the side that the first driven plates 521 are assembled, than the remaining non-protruding ones of the first teeth 272, i.e., a plurality of non-protruding teeth 272*c*, to the side that the first driven plates 521 are assembled. The plural first protruding teeth 272*a* are provided in symmetric positions about a rotational center, and this layout is also true of the plural missing portions 272*b*. It should be noted that the positions of the distal end surfaces of the non-protruding teeth 272*c* are identical to the position of the axial end surface of the body 271 of the tubular portion 27.

With the aforementioned first protruding teeth 272*a* being provided, assembling work is easily done in assembling the first driven plates 521 to the first teeth 272 of the tubular portion 27 of the clutch center 13. Detailedly, when it is assumed that the first teeth 272 do not include the first protruding teeth 272*a*, assembling work is required to be done by making positional alignment between the first teeth 272 and the engaging recesses 521*a* of the first driven plates 521 in a condition that the first driven plates 521 are kept accurately in parallel to the end surfaces of the first teeth 272, i.e., the axial end surface of the tubular portion 27. Therefore, when at least one of the first driven plates 521 slants with respect to the axial end surface of the tubular portion 27, the engaging recesses 521*a* of the at least one of the first driven plates 521 get stuck with the first teeth 272, whereby the assembling work is made difficult.

By contrast, the first teeth 272 herein include the first protruding teeth 272*a*, and the first protruding teeth 272*a* function as slide guides in assembling work. Therefore, only some of the engaging recesses 521*a* of each first driven plate 521 are slid onto the first protruding teeth 272*a*, and each first driven plate 521 can be further slid onto the first teeth 272 of the tubular portion 27 while the first protruding teeth 272*a* function as the slide guides. Because of this, it is possible to inhibit occurrence of sticking between the first teeth 272 and the engaging recesses 521*a* in assembling work, whereby each driven plate 521 is easily assembled to the first teeth 272.

Likewise, as shown in FIG. 3, the second teeth 412 of the pressure plate 14 also include a plurality of (six in this example) second protruding teeth 412*a* that protrude to the second side in the axial direction. Additionally, the plural second teeth 412 are partially missing at six sites, and the missing portions are provided as missing portions 412*b*. It should be noted that the second side in the axial direction is a side on which the second driven plate 522 is assembled to the pressure plate 14.

Specifically, the second protruding teeth 412*a* further protrude, at the end surfaces thereof located on the side that the second driven plate 522 is assembled, than the remaining non-protruding ones of the second teeth 412, i.e., a plurality of non-protruding teeth 412*c*, to the side that the second driven plate 522 is assembled. The plural second protruding teeth 412*a* are provided in symmetric positions about a rotational center, and this layout is also true of the missing portions 412*b*.

With the aforementioned second protruding teeth 412*a* being provided, similarly to the above, assembling work is easily done in assembling the second driven plate 522 to the second teeth 412 of the tubular portion 41 of the pressure plate 14.

Figure 10:
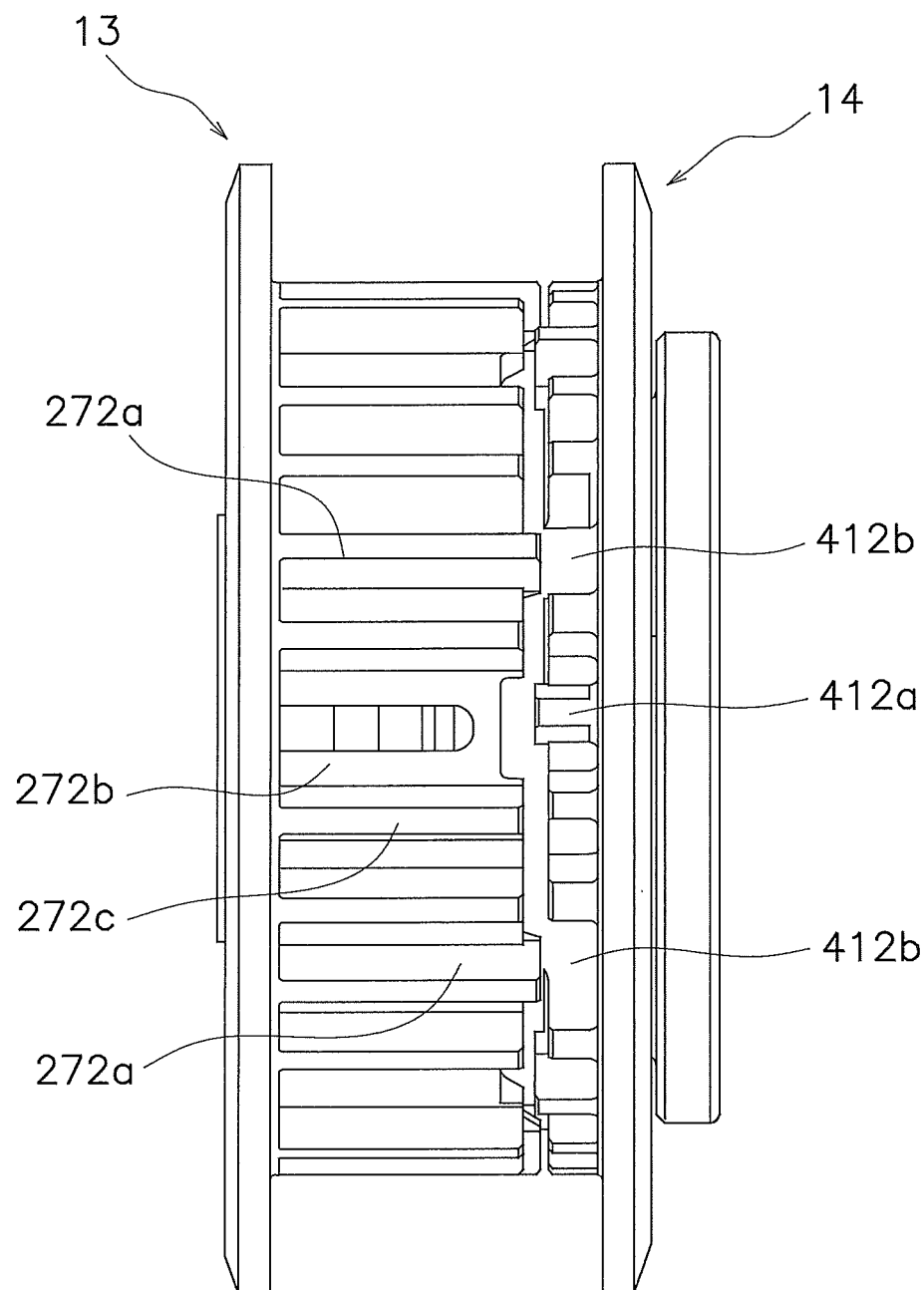
FIG. 10 is an external side view of the clutch center and the pressure plate.

As shown in FIG. 10, the clutch center 13 and the pressure plate 14 are herein disposed such that the first protruding teeth 272*a* of the clutch center 13 and the missing portions 412*b* of the pressure plate 14 are axially opposed to each other, respectively. Additionally, the clutch center 13 and the pressure plate 14 are disposed such that the second protruding teeth 412*a* of the pressure plate 14 and the missing portions 272*b* of the clutch center 13 are axially opposed to each other, respectively.

Moreover in the clutch center 13, the axial end surface of each missing portion 272*b* is shaped to retract to the second side in the axial direction from the axial end surface (distal end surface) of each non-protruding tooth 272*c*.

With the configuration described above, even when the friction members of the drive plates 51 abrade whereby the pressure plate 14 approaches the clutch center 13 from the initial state thereof, collision can be avoided between the first protruding teeth 272a of the clutch center 13 and the second protruding teeth 412a of the pressure plate 14.

[Actions]

When a release operation is not being performed in the clutch device 10, the support plate 16 and the pressure plate 14 are urged oppositely to each other by the coil springs 19. The support plate 16 is fixed to the clutch center 13, and is not moved in the axial direction. Hence, the pressure plate 14 is moved to the second side in the axial direction. As a result, the clutch part 15 is turned to the clutch-on state.

In this state, a torque from the engine is inputted to the clutch housing 12 through the input gear 20, and is then transmitted to the clutch center 13 and the pressure plate 14 through the clutch part 15.

Next, actions of the assist cam mechanism 17 and the slipper cam mechanism 18 will be explained in detail.

When a forward drive force acts on the clutch center 13 and the pressure plate 14, in other words, when a positive-side torque acts on the clutch center 13 and the pressure plate 14, a torque inputted to the clutch housing 2 is outputted to the clutch center 13 and the pressure plate 14 through the clutch part 15. The torque inputted to the pressure plate 14 is outputted to the support plate 16 through the assist cam mechanism 17. The torque inputted to the support plate 16 is outputted to the clutch center 13 through the respective fixation protrusions 62 and 32. In this way, the torque is transmitted from the pressure plate 14 to the support plate 16, and simultaneously, the assist cam mechanism 17 is actuated.

Specifically, when the forward drive force acts on the clutch center 13 and the pressure plate 14, the pressure plate 14 is rotated relatively to the support plate 16 in the +R direction shown in FIG. 9. Accordingly, the PPa cam surfaces 17b are pressed to the SP cam surfaces 17a. The clutch center 13 is not herein moved in the axial direction. Because of this, the support plate 16 is not moved in the axial direction as well. Hence, the PPa cam surfaces 17b are moved along the SP cam surfaces 17a, whereby the pressure plate 14 is moved to the second side in the axial direction. In other words, the pressure applying portion 42 of the pressure plate 14 is moved toward the pressure receiving portion 28 of the clutch center 13. As a result, the clutch part 15 is firmly interposed between and held by the pressure applying portion 42 and the pressure receiving portion 28. This increases the clutch engaging force.

On the other hand, when a rider returns a throttle grip to reduce acceleration, a reverse drive force acts on the clutch device 10 through the clutch center 13. In this case, the slipper cam mechanism 18 is actuated. In other words, the clutch center 13 is rotated relatively to the pressure plate 14 in the +R direction shown in FIG. 9 by a torque from the transmission side. From a reverse point of view, the pressure plate 14 is rotated relatively to the clutch center 13 in the −R direction as shown in FIG. 9. With this relative rotation, the CC cam surfaces 18a and the PPs cam surfaces 18b are pressed to each other. The clutch center 13 is not moved in the axial direction. Hence, due to this pressing, the PPs cam surfaces 18b are moved along the CC cam surfaces 18a, whereby the pressure plate 14 is moved to the first side in the axial direction. As a result, the pressure applying portion 42 is moved oppositely to the pressure receiving portion 28. This reduces the clutch engaging force.

Next, when the rider squeezes a clutch lever, the operating force is transmitted to the release mechanism (not shown in the drawings) through a clutch wire and so forth. The pressure plate 14 is moved by the release mechanism against the urging forces of the coil springs 19 to the first side in the axial direction. When the pressure plate 14 is moved to the first side in the axial direction, the pressing force applied to the clutch part 15 from the pressure plate 14 is released, and the clutch part 15 is turned to a clutch-off state. In this clutch-off state, rotation from the clutch housing 12 is not transmitted to the clutch center 13.

Other Preferred Embodiments

The present advancement is not limited to the preferred embodiment described above, and a variety of changes or modifications can be made without departing from the scope of the present advancement.

(a) The aforementioned preferred embodiment has been explained with the clutch center as an exemplary first rotor, the pressure plate as an exemplary second rotor and the support plate as an exemplary support member. In other words, in the aforementioned preferred embodiment, the present advancement is applied to a so-called pull-type clutch device in which the pressure plate is moved to the first side in the axial direction so as to turn the clutch part to the clutch-off state. However, the present advancement is similarly applicable to a so-called push-type clutch device as well.

Figure 11A:
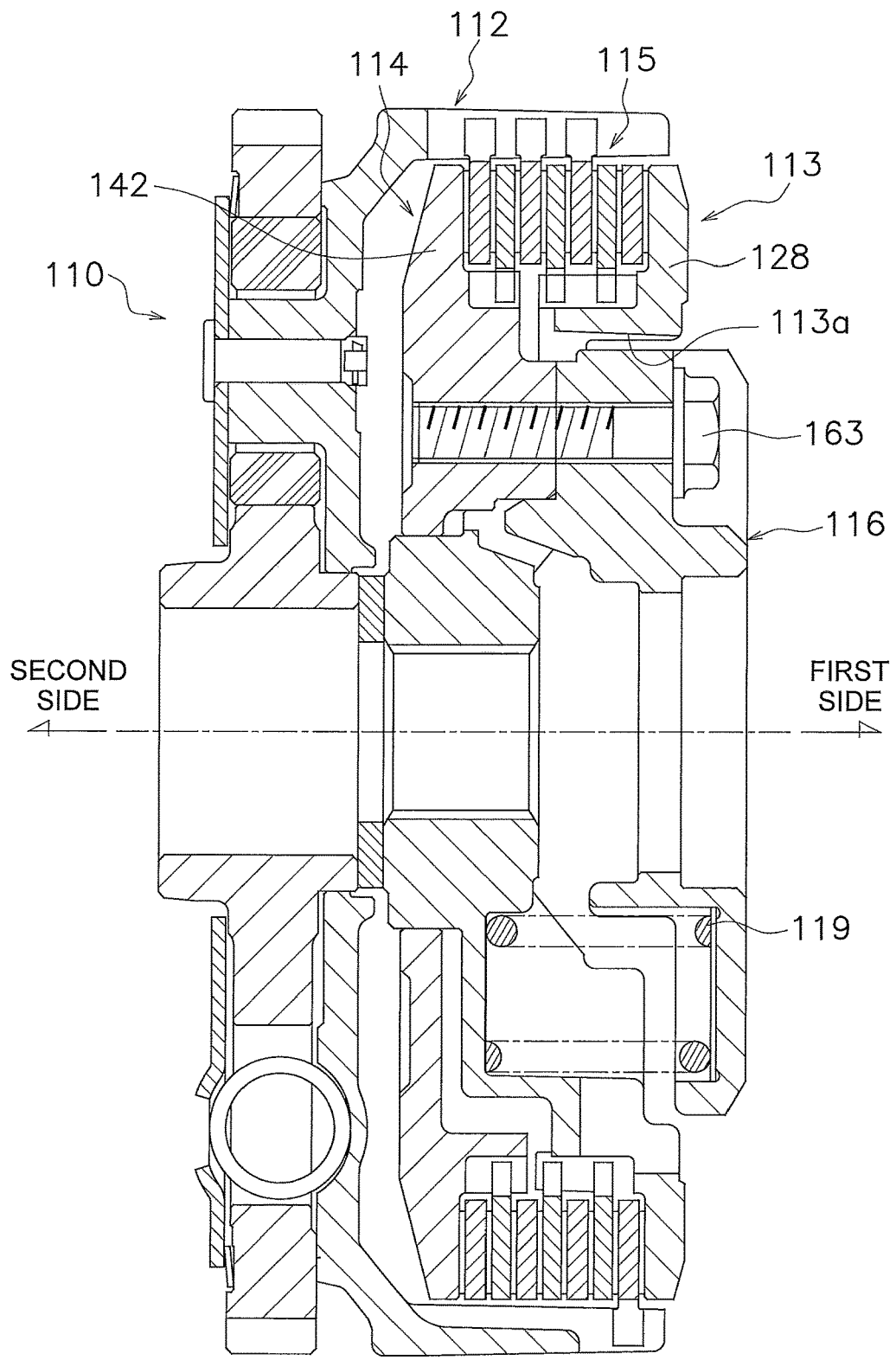
FIG. 11A is a cross-sectional view of a push-type clutch device according to another preferred embodiment.
Figure 11B:
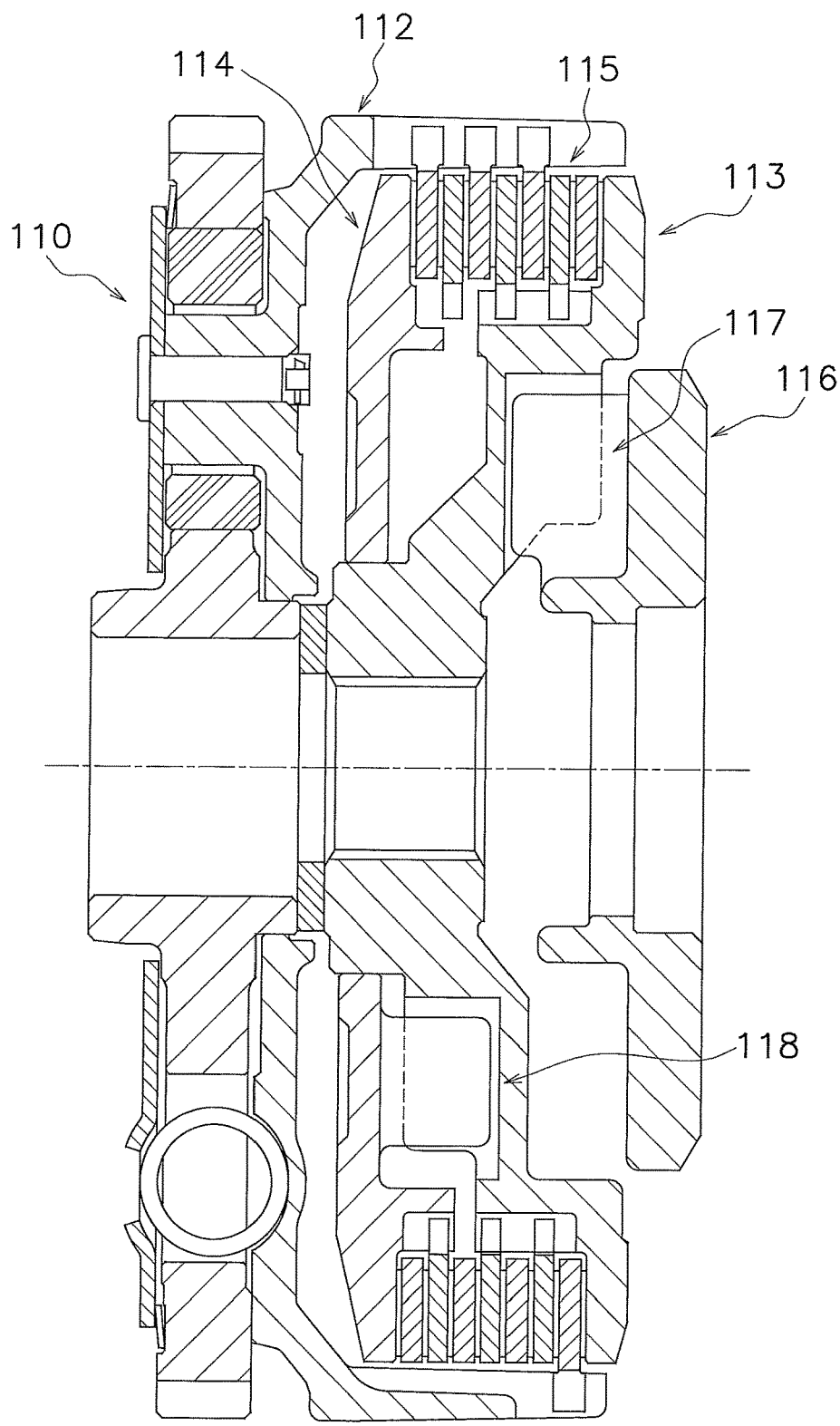
FIG. 11B is another cross-sectional view of the clutch device shown in FIG. 11A.

FIGS. 11A and 11B show a push-type clutch device. FIG. 11A corresponds to FIG. 1A, whereas FIG. 11B corresponds to FIG. 1B.

In a push-type clutch device 110, a pressure plate 114 corresponds to the first rotor; a clutch center 113 corresponds to the second rotor; and a lifter plate 116 corresponds to the support member.

Specifically, in the push-type clutch device 110, the pressure plate 114, the clutch center 113 and the lifter plate 116 are disposed from the second side to the first side in the axial direction. The pressure plate 114 and the lifter plate 116 are fixed to each other by at least one bolt 163 through at least one opening 113a provided in the clutch center 113. Additionally, at least one coil spring 119 is disposed between the clutch center 113 and the lifter plate 116. Moreover, a clutch part 115 is disposed between a pressure applying portion 142 of the pressure plate 114 and a pressure receiving portion 128 of the clutch center 113. These respective members are accommodated in the interior of a clutch housing 112 similarly to those of the pull-type clutch device 10.

The clutch center 113 is not moved in the axial direction. Hence, the lifter plate 116 is urged by the at least one coil spring 119 to the first side in the axial direction. In other words, the pressure plate 114 fixed to the lifter plate 116 is urged to the first side in the axial direction and is pressed onto the clutch center 113, whereby the clutch part 115 is turned to the clutch-on state.

Then, when the lifter plate 116 and the pressure plate 114 are moved to the second side in the axial direction against the urging forces of the at least one coil spring 119, the clutch part 115 is turned to the clutch-off state.

Additionally, in the push-type clutch device 110, as shown in FIG. 11B, a slipper cam mechanism 118 is provided axially between the pressure plate 114 and the clutch center 113, whereas an assist cam mechanism 117 is provided axially between the clutch center 113 and the lifter plate 116. Actuations of the respective cam mechanisms 117 and 118 are basically similar to those in the pull-type clutch device 10.

(b) The configurations of the clutch center and the pressure plate are not limited to those in the aforementioned preferred embodiment. For example, in the aforementioned preferred embodiment, the disc portion 26, the tubular portion 27 and the pressure receiving portion 28 are integrated in the clutch center 13. However, these portions may be provided as separate members. This configuration may be true of the pressure plate 14, and the boss portion 40, the tubular portion 41 and the pressure applying portion 42 may be provided as separate members.

(c) The aforementioned preferred embodiment has exemplified the configuration that the height H of the second tubular portion of the pressure plate is set such that the second tubular portion extends to the terminal end of each cam surface 17b, 18b. However, the height H of the second tubular portion is not required to be set such that the second tubular portion extends to the terminal end of each cam surface 17b, 18b as long as the second tubular portion extends beyond the starting end of each cam surface 17b, 18b.

(d) In the aforementioned preferred embodiment, the pressure plate is configured to be urged by the coil springs. However, disc springs or so forth may be used instead of the coil springs.

What is claimed is:

1. A clutch device comprising:
   a clutch housing;
   a first rotor in an interior of the clutch housing, the first rotor including a first pressure applying portion, a first tubular portion, and a plurality of first protruding portions, the first tubular portion shaped to protrude to a first side in an axial direction, the plurality of first protruding portions disposed on an inner peripheral side of the first tubular portion, the plurality of first protruding portions protruding to the first side in the axial direction;
   a second rotor including a second pressure applying portion and a second tubular portion, the second pressure applying portion disposed apart from the first pressure applying portion in the axial direction, the second tubular portion provided on the inner peripheral side of the first tubular portion, the second tubular portion shaped to protrude to the second side in the axial direction;
   a support member disposed axially opposite to the first rotor in a state where the second rotor is interposed therebetween, the support member fixed to the first rotor, the support member including a plurality of second protruding portions protruding to the second side in the axial direction;
   a clutch part configured and arranged to allow and block transmission of power from the clutch housing to an output side, the clutch part disposed between the first pressure applying portion and the second pressure applying portion; and
   a cam mechanism including a first cam and a second cam, the cam mechanism configured to control a pressing force applied to the clutch part,
   at least one of the plurality of second protruding portions being attached to at least one of the plurality of first protruding portions in the axial direction,
   a bolt extending in the axial direction to penetrate a center portion of the at least one of the plurality of first protruding portions and a center portion of the at least one of the plurality of second protruding portions, and
   the first cam being disposed on the at least one of the plurality of first protruding portions and the second cam being disposed on the at least one of the plurality of second protruding portions.

2. The clutch device according to claim 1, wherein
   each of the first cam and the second cam is shaped to extend in the axial direction from an axially first side end thereof provided as a starting end, and
   the second tubular portion extends in the axial direction from an axially first side end surface thereof beyond the starting end of the each of the first cam and the second cam.

3. The clutch device according to claim 1, wherein
   the plurality of first protruding portions are disposed on the inner peripheral side of the second tubular portion.

4. The clutch device according to claim 1, wherein the plurality of first protruding portions each include a cam protrusion, the cam protrusion provided with a cam surface, the cam surface forming part of the cam mechanism.

5. The clutch device according to claim 1, wherein
   the second rotor includes a plurality of openings, and
   the plurality of first protruding portions each include a first fixation protrusion to which the support member is fixed, the first fixation protrusion inserted into each of the plurality of openings.

6. The clutch device according to claim 1, wherein an inner peripheral surface of the first tubular portion is fitted to an outer peripheral surface of the second tubular portion while a clearance is kept therebetween.

7. The clutch device according to claim 1, wherein
   the first rotor is a clutch center, the clutch center including a pressure receiving portion having an annular shape on an outer peripheral part thereof, the clutch center coupled at an inner peripheral part thereof to a transmission-side member, the pressure receiving portion corresponding to the first pressure applying portion,
   the second rotor is a pressure plate, the pressure plate disposed on the first side of the clutch center in the axial direction so as to be movable in the axial direction with respect to the clutch center, the pressure plate including a pressure applying portion, the pressure applying portion disposed apart from the pressure receiving portion, the pressure applying portion corresponding to the second pressure applying portion,
   the support member is a support plate, the support plate fixed to the clutch center, the support plate applying the pressing force to the pressure plate, and
   the clutch device further comprises an urging member disposed between the support plate and the pressure plate, the urging member applying the pressing force to the pressure plate so as to turn the clutch part to a power transmission allowed state.

8. The clutch device according to claim 1, wherein
   the second rotor is a clutch center, the clutch center including a pressure receiving portion having an annular shape on an outer peripheral part thereof, the clutch center coupled at an inner peripheral part thereof to a transmission-side member, the pressure receiving portion corresponding to the second pressure applying portion,
   the first rotor is a pressure plate, the pressure plate disposed on the second side of the clutch center in the axial direction so as to be movable in the axial direction with respect to the clutch center, the pressure plate including a pressure applying portion, the pressure applying portion disposed apart from the pressure receiving portion, the pressure applying portion corresponding to the first pressure applying portion, and
   the clutch device further comprises
   a lifter plate fixed to the pressure plate, the lifter plate pressing the pressure plate onto the clutch center, and an urging member disposed between the lifter plate and the clutch center, the urging member applying the pressing force to the pressure plate so as to turn the clutch part to a power transmission allowed state.

* * * * *